M. W. COLWELL,

Assignor to F. A. HULL.

Barbed Wire-Fence.

No. 8,665. Reissued April 8, 1879.

Witnesses.
Otis Stufeland.
James L. Norris.

Inventor.
Myron W. Colwell.
by
Van Santvoord & Hauff
his attorneys.

N. PETERS, PHOTO-LITHOGRAPHER, WASHINGTON, D. C.

UNITED STATES PATENT OFFICE.

MYRON W. COLWELL, OF DUNLAP, IOWA, ASSIGNOR TO FREDERICK A. HULL, OF DANBURY, CONNECTICUT.

IMPROVEMENT IN BARBED-WIRE FENCES.

Specification forming part of Letters Patent No. 175,667, dated April 4, 1876; Reissue No. 8,665, dated April 8, 1879; application filed February 8, 1879.

*To all whom it may concern:*

Be it known that I, MYRON W. COLWELL, of Dunlap, in the county of Harrison and State of Iowa, have invented a new and useful Improvement in Barbed-Wire Fences, which improvement is fully set forth in the following specification, reference being had to the accompanying drawings, in which—

Figure 1:
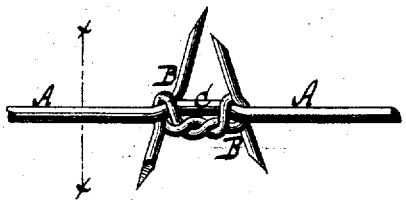
Figure 2:
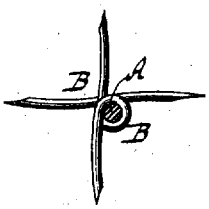
Figure 3:
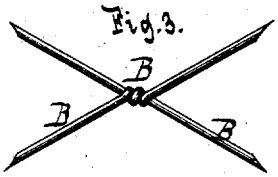

Figure 1 shows a fence-wire provided with my invention. Fig. 2 is a cross-section thereof, taken in the line *x x*, Fig. 1. Fig. 3 is a detail view of the barb before it is turned around the fence-wire.

Similar letters indicate corresponding parts.

The aim of my invention is to produce a quadruple barb for attachment to fence-wire which can be manufactured at low cost and easily applied; also to produce a simple and firm union of the barb with such wire; and it consists in a barb composed of two pieces of wire, which are twisted together, and permanently interlocked between their ends, leaving the end parts thereof to project, to form four prongs.

I fasten this barb to a fence-wire by turning each of the prongs around the same, and hold the barb in position by means of an offset in the fence-wire.

In the drawings, the letter A designates the fence-wire, and B is the barb.

In the construction of the barb B, I use two pieces of wire, of equal length, or nearly so, to each other, and preferably pointed at their ends, which I twist together, so as to permanently interlock them at their centers by suitable means, leaving the end parts of the two wires turned out, as shown in Fig. 3, so that the barb has quadruple prongs.

In this manner I produce a very efficient barb out of the least amount of material, and with little labor, and one which is easy of application to a fence-wire.

At the point where the barb B is to be attached to the fence-wire A, I bend or crimp the latter by a suitable instrument, so as to form therein an offset, C, longer than the twist of the barb, or of equal length thereto. When the barb B is to be attached to the fence-wire A the barb is placed upon the latter with its twist in the offset C, and then its two pairs of ends or prongs are turned around the fence-wire in such a way that the four points of the two wires may be at right angles to each other and to the fence-wire, or nearly so, as shown in Fig. 2. Those portions of the barb B turned around the fence-wire A are thus brought adjacent to the ends of the offset C, and by this means the barb is firmly kept in its place.

What I claim as new, and desire to secure by Letters Patent, is—

1. A barb composed of two pieces of wire twisted together and permanently interlocked between their ends, leaving the end parts thereof project to form four prongs adapted to be turned around a fence-wire, substantially as shown and described.

2. In combination with a fence-wire, a barb which is composed of two pieces of wire twisted together and permanently interlocked between their ends, to form four prongs, and which is fastened to the fence-wire by turning the prongs around the same, leaving the points of the prongs project, substantially as shown and described.

3. In combination with a fence-wire having a suitable bend or indentation, a barb which is composed of two pieces of wire twisted together between their ends to form four prongs, and which is fastened to the fence-wire by turning the prongs around the same, adjacent to the ends of the same bend or indentation, leaving the points of the prongs projecting, substantially as shown and described.

In testimony that I claim the foregoing I have hereunto set my hand and seal this 29th day of January, 1879.

MYRON W. COLWELL. [L. S.]

Witnesses:

H. W. GLEASON,

L. A. SHERMAN.